Patented May 24, 1949

2,471,092

UNITED STATES PATENT OFFICE 2,471,092

PREPARATION OF 3-THENALDEHYDE

Ernest E. Campaigne and William M. Le Suer, Bloomington, Ind., assignors to Indiana University Foundation, Monroe County, Ind., a corporation of Indiana No Drawing. Application November 28, 1947, Serial No. 788,665

4 Claims. (Cl. 260—329)

The present invention relates to the preparation of 3-thenaldehyde and is more particularly concerned with a method for the preparation thereof from 3-thenyl bromide. The reaction of the present invention proceeds according to the general sequence outlined below:

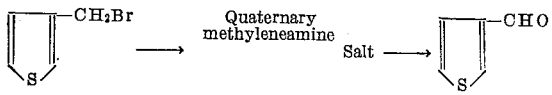

It is an object of the present invention to provide a novel method for the preparation of 3-thenaldehyde. It is a further object of the present invention to provide a two-step method for the preparation of 3-thenaldehyde from 3-thenyl bromide. An additional object is the provision of such a process whereby high yields of desired 3-thenaldehyde may be obtained. Other objects of the invention will become apparent hereinafter.

The synthesis of 3-thenaldehyde has been previously carried out with only poor yields according to a reaction which utilized the difficultly obtainable 3-iodothiophene [Steinkopf and Schmitt, Ann., 533, 264 (1938)]. According to the present invention, we are able to utilize the more readily obtainable 3-thenyl bromide and to obtain high yields of the desired 3-thenaldehyde according to a relatively simple procedure.

The method of the present invention utilizes as starting material 3-thenyl bromide. This compound is converted to a quaternary methyleneamine salt, such as the hexamethylenetetramine salt. This salt usually separated immediately from organic solvent, e. g., chloroform, employed for the reaction. This is particularly advantageous in that, if any nuclearly-substituted bromothiophene is present as an impurity in the 3-thenyl bromide, this nuclearly-substituted material remains in solution, and thereby a separation is effected. The quaternary methyleneamine salt of the 3-thenyl bromide may then be steam-distilled from an aqueous solution thereof and acidified to yield the desired 3-thenaldehyde.

The starting 3-thenyl bromide may be prepared from a reaction of equimolar quantities of 3-methylthiophene and N-bromosuccinimide in the presence of a small amount of benzoyl peroxide. The preparation of 3-thenyl bromide is more fully disclosed and claimed in our copending application Serial No. 788,664, filed concurrently herewith.

The preparation of an amine salt of 3-thenyl bromide may be readily accomplished by mixing together the particular tertiary methyleneamine, e. g., hexamethylenetetramine, in an organic solvent such as chloroform, carbon tetrachloride, tetrachloroethylene, or benzene. The mixture may be maintained at a temperature between about 20 degrees and about 120 degrees centigrade, preferably at the reflux temperature of the particular solvent employed. Equimolar quantities of reactants are satisfactory, no particular advantage being gained by the employment of an excess of either reactant. After maintaining in contact for a sufficient period of time, e. g., from one-half to one hour, the reaction product may be cooled and the salt removed by suction filtration. Solvent may be removed by distillation and the salt washed with ether or other suitable organic solvent and dried. The salt may be further purified, if desired, by crystallization from absolute alcohol, usually separating in the form of white needles which may be readily dissolved in hot water and steam-distilled. The distillate may then be acidified, as with hydrochloric acid, and extracted with ether or other suitable solvent, dried, and the solvent removed. Distillation of the residue at atmospheric pressure, and, if desired, acidification to remove amine impurities from the organic layer, yields the desired 3-thenaldehyde.

The following example is given to illustrate the practice of the present invention, but is in no way to be construed as limiting:

Eighty-eight and one-half grams (0.5 mole) of N-bromosuccinimide and 0.2 gram of benzoyl peroxide were added to a solution of 55 grams (0.56 mole) of 3-methylthiophene in 150 milliliters of carbon tetrachloride. The reaction flask was shaken vigorously to dispense the peroxide whereafter heating was commenced. An additional 0.2 gram of benzoyl peroxide was added to the flask during the first ten minutes of heating, and the flask and contents were shaken vigorously during the first hour of heating. After an additional five hours of refluxing, the flack was cooled in an ice-bath. Succinimide was removed by suction filtration and washed with carbon tetrachloride. The wash was then added to 50 milliliters of the main carbon tetrachloride solution, together with the solution from an identical run, prior to removal of solvent by distillation under reduced pressure. The highly lachrymatory oil which remained was distilled under vacuum and 114 grams of light tan oil collected at 60–100 degrees centigrade under 2 millimeters of mercury pressure. This material darkened slowly upon standing. Purification yielded a sample boiling at about 75–78 degrees centigrade at 1 millimeter of mercury pressure absolute; $d_4^{20}$ 1.635, $n_D^{20}$ 1.604.

The 114 grams of 3-thenyl bromide from the above was dissolved in 200 milliliters of chloroform and 90 grams of hexamethylenetetramine added thereto. The mixture was refluxed for a period of one hour, cooled, and the hexamethylenetetramine salt removed by suction filtration. The hexamethylenetetramine salt was washed with 100 milliliters of ether and dried in air to yield 150 grams of the salt, which was purified by crystallization from absolute ethanol to yield white needles. These needles softened at 120 degrees centigrade and melted completely with browning at 150 degrees centigrade.

*Anal.*—Calcd. for $C_{11}H_{17}N_4SBr$: S, 10.10
    Found: S, 9.80

The hexamethylenetetramine salt (150 grams), prepared as above, was dissolved in 500 milliliters of hot water and rapidly steam-distilled, one liter of distillate being collected in all. The distillate was acidified with hydrochloric acid and extracted with three 100-milliliter portions of ether. The ether solution was dried and the ether removed on a steam bath. Distillation of the residue at atmospheric pressure yielded 35.8 grams of 3-thenaldehyde, B. P., 195–199 degrees centigrade at 744 millimeters of mercury pressure absolute; $D_4^{24}$ 1.2800, $n_D^{20}$ 1.5860.

The 3-thenaldehyde phenylhydrazone crystallized as white leaflets from a solution of water and ethanol, M. P. 136–137 degrees centigrade.

The 3-thenaldehyde 2,4-dinitrophenylhydrazone crystallized as deep orange needles from nitromethane, M. P. 236–237 degrees centigrade.

*Anal.*—Calcd. for $C_{11}H_8O_4N_4S$: S, 10.97
    Found: S, 11.09

The 3-thenaldehyde semicarbazone crystallized from a water-ethanol solution as white leaflets, M. P., 233–234 degrees centigrade.

*Anal.*—Calcd. for $C_6H_7N_3OS$: S, 18.95
    Found: S, 19.25

Various modifications may be made in the present invention without departing from the spirit or scope thereof, and it is to be understood that we limit ourselves only as defined in the appended claims.

We claim:

1. The process which includes: steam-distilling a water solution of a quaternary methyleneamine salt of 3-thenyl bromide.

2. The process of claim 1, wherein the amine salt is the hexamethylenetetramine salt.

3. The process which includes: dissolving the hexamethylenetetramine salt of 3-thenyl bromide in water, steam-distilling, and acidifying the distillate to produce 3-thenaldehyde.

4. The process of claim 3, wherein the 3-thenaldehyde is extracted from the distillate with an organic solvent.

ERNEST E. CAMPAIGNE.
WILLIAM M. LE SUER.

No references cited.